June 3, 1952　　　J. MUIRHEAD　　　2,598,818
FILTER
Filed April 14, 1948
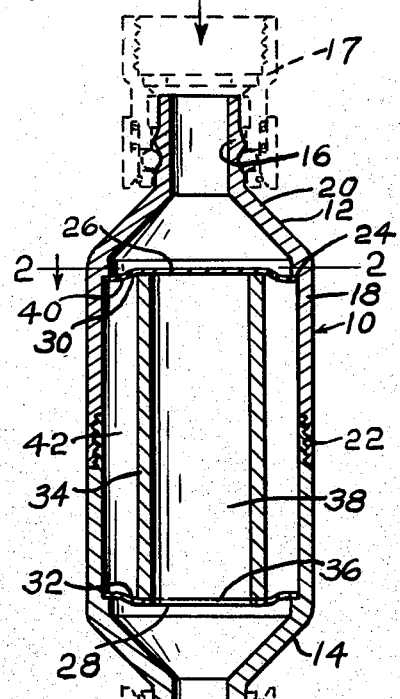
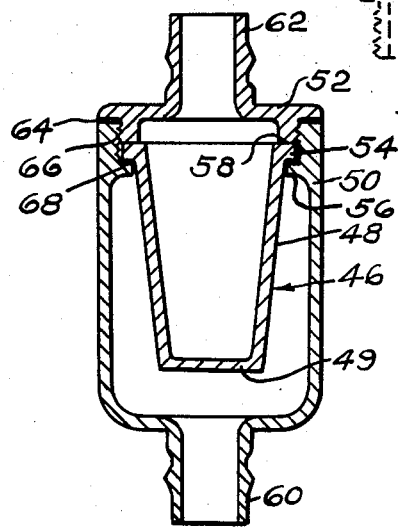
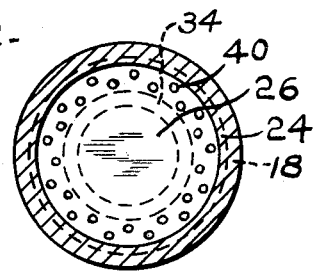
INVENTOR
JAMES MUIRHEAD
BY
ATTORNEY Patented June 3, 1952

2,598,818

UNITED STATES PATENT OFFICE 2,598,818

FILTER

James Muirhead, Syracuse, N. Y., assignor to Easy Washing Machine Corporation, Syracuse, N. Y., a corporation of Delaware Application April 14, 1948, Serial No. 21,082

1 Claim. (Cl. 210—164)

This invention relates to filters, and more particularly to filters adapted for household use in connection with water supply systems.

In household water supply, there are often impurities suspended in the water such as rust, dirt and metallic substances, which, when such water is employed for laundry purposes, may result in discoloration of fabrics. Such particles in general will collect upon the fabrics, since the fabrics in themselves act as a filter.

It is an object of the present invention to provide a filter which will remove such impurities from the water supply and which may be readily reversed for cleaning and long life.

Another object of the invention is to provide such a filter which may be readily manipulated by the housewife. It is relatively simple in construction, inexpensive of manufacture and easily incorporated in the water supply for laundry apparatus.

Another object of the invention is to provide a filter in which the filter element thereof may be readily replaced.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

In the drawings, wherein like reference characters indicate like parts:

Figure 1 is a longitudinal section taken through a filter incorporating the invention;

Figure 2 is a transverse section taken substantially on the line 2—2 of Figure 1; and Figure 3 is a slightly modified form of the invention.

In the drawings, there is shown in Figures 1 and 2, a filter comprising a shell 10 composed of end parts 12 and 14, each of which is somewhat similar in shape and each of which comprises a nipple portion 16, a barrel portion 18 and a head portion 20 interconnecting the nipple portion with the barrel portion. The parts 12 and 14 are secured together by complementary screw threads 22 upon the members. Each of the members is provided with an internal shoulder 24 against which rest saucer-like disk members 26 and 28, the central portion of each of which is offset as at 30 and 32, respectively, to engage and center the tubular filter element 34 axially positioned within the barrel portion 18 of the filter.

The end disk 28 is provided with a central aperture 36 to admit fluid into or out of the region 38 within the filter element, and the disk 26 is provided with openings 40 adjacent its peripheral edge in order to freely admit fluid into or out of the annular region 42 around the filter element 34. The filter element 34 may be composed of relatively rigid filter material such as porous bronze or other coarse material or porous metal which will admit of the passage of water therethrough but block the passage of suspended impurities or precipitates of the type often found in domestic water supply systems, as particularly, for example, rust. The internal and external surfaces of the filter element are relatively smooth, so that upon collection of impurities upon the exterior wall thereof, such impurities may be quickly dislodged by return or reverse flow of water through such filter.

It will be observed that the nipples 16 at opposite ends of the filter are identical, the nipple shown being of the type adapted to be received in an automatic hose coupling 17 or 19, such as shown in Scheiwer Patent 2,135,221, issued November 1, 1938, although the nipple might be of the threaded variety such as is customarily used on domestic rubber hose commonly used for supplying laundry apparatus with water from a domestic water supply faucet.

By equipping the filter at either end with identical fittings of the manually operable type, the filter is easily reversed in its position with reference to the direction of flow of the water, so that particles held back by the filter element may be quickly washed out of the filter by reverse flow. In practice, such a filter may be placed in the supply conduit for laundry apparatus and water drawn therethrough in one direction for a period of time. Thereafter, the filter may be reversed and the initial water passing through the filter, upon being reversed, may be allowed to discharge into the drain carrying the previously entrapped impurities with it. However, once such initial flow of water has passed through the filter in the reverse direction and carried with it impurities collected prior to reversal, the discharge from the filter may be coupled to the laundry apparatus, or delivered direct to the open tub or tubs of the laundry apparatus, depending upon the type of apparatus. It will thus be seen that by periodic cleansing thereof of the impurities previously collected, during the initial flow of water therethrough in the reverse direction, the laundry operator may have available filtered water free of the undesirable impurities hereinabove referred to.

The construction of the filter is such that it is substantially equally effective in either direction of flow of water therethrough so that in practice, it will make no substantial difference how the filter is connected in the water supply. When the term reversal is used in describing the apparatus as above, it is intended to mean that the filter may be merely reversed from its former position whence, after use in that position, it may be again reversed.

It will be seen that by the construction shown, the two end shell members may be readily uncoupled and the filter element 34 removed therefrom in the event the same becomes clogged or too highly restrictive to the ready flow of water therethrough. Also, the shell members may be initially formed alike, in the form of a single die casting, casting, or by any other process, it being merely necessary to place a female thread on one member and a male thread on the other, or other complemental attaching means, to complete the shells. The ease with which the filter may be disassembled and a new element placed in position is also in part due to the disk means resting upon the shoulders 24, whereby the element may be securely held in central position by axial thrust such that the end surfaces of the element are in tight contact with the disks 26 and under the axial pressure of the threaded or other connecting means employed, shown at 22.

A variation of the invention is shown in Figure 3, wherein the filter element 46 comprises a tubular section 48 closed at one end as at 49 adapted to be secured at the other end by the shell members 50 and 52. For this purpose, the filter element is provided with a flange 54 adapted to be axially engaged by shoulder 56 on the shell member 50 and the shoulder 58 of the shell member 52. As in the former modification, the shell members are provided with similar nipples 60 and 62 and the filter is readily reversible in the same manner as described in connection with the construction shown in Figure 1. The filter element may be porous bronze or other metal, which may be powdered and sintered under heat and pressure as previously, and due to the slightly conical shape of the tubular portion thereof, may be readily cast with relatively smooth internal and external filter walls, to which the impurities will not adhere and from which such impurities will be readily dislodged by reversal of flow through the filter element. The shell portions in Figure 3 may be provided with a gasket 64, and to permit yielding thereof in drawing the shell members together by the threaded connection 66, a yielding gasket 68 may be positioned between the shoulder 56 and the flange 54 if desired. The resulting structure is substantially symmetrical in its outward appearance about a plane bisecting the central axis.

Although several modifications of the invention have been illustrated and described, it is to be understood that the invention is not limited thereto. As various changes in the construction and arrangement may be made without departing from the spirit of the invention, as will be apparent to those skilled in the art, reference will be had to the appended claim as a definition of the limits of the invention.

What is claimed is:

A filter consisting of the following parts, a pair of substantially alike complementary shell members each having a reduced diameter portion at one end provided with a fitting, and an enlarged barrel portion at the other end with threaded means for connecting each of the barrel portions together, an integral internal annular shoulder within the enlarged barrel portion of each of said shells near the fitting end thereof, a pair of spaced concave saucer-like disk members, each being similar in shape and having a circular flat center area portion, surrounded by an annular offset portion and a radial annular rim portion, the rims of each being seated respectively upon said shoulders with their concavities facing one another, one of said members having a central aperture in the central part of the center area portion and the other having apertures arranged in the annular rim and offset portions, and a tubular radial flow filter element coaxially supported under axial pressure between said members said element being of a diameter to seat upon the flat center area portions, and be centered thereon by the offset portions and of a length to bear against said disc members under pressure, when the shell members are assembled.

JAMES MUIRHEAD.

REFERENCES CITED

The following references are of record in the file of this patent:

UNITED STATES PATENTS

| Number | Name | Date |
| --- | --- | --- |
| 535,817 | Darling | Mar. 19, 1895 |
| 622,217 | Fuller | Apr. 4, 1899 |
| 742,254 | Stern | Oct. 27, 1903 |
| 1,207,593 | Miller | Dec. 5, 1916 |
| 1,329,398 | Hachmann | Feb. 3, 1920 |
| 2,019,094 | Rice | Oct. 29, 1935 |
| 2,265,550 | Smith | Dec. 9, 1941 |
| 2,383,672 | Niesingh | Aug. 28, 1945 |
| 2,389,814 | Pond et al. | Nov. 27, 1945 |

FOREIGN PATENTS

| Number | Country | Date |
| --- | --- | --- |
| 20,584 | Great Britain | Nov. 29, 1906 |